(12) United States Patent
Kumar (10) Patent No.: US 8,103,813 B2
(45) Date of Patent: Jan. 24, 2012

(54) METHOD AND SYSTEM FOR HARDWARE BASED IMPLEMENTATION OF USB 1.1 OVER A HIGH SPEED LINK

(75) Inventor: Sasi K. Kumar, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 1121 days.

(21) Appl. No.: 11/304,358

(22) Filed: Dec. 15, 2005

(65) Prior Publication Data

US 2007/0011375 A1  Jan. 11, 2007

Related U.S. Application Data

(60) Provisional application No. 60/697,571, filed on Jul. 8, 2005.

(51) Int. Cl.
*G06F 13/42* (2006.01)
(52) U.S. Cl. .......................................... 710/106; 710/65
(58) Field of Classification Search .................... 710/62, 710/64–65, 106, 313, 315
See application file for complete search history.

(56) References Cited

U.S. PATENT DOCUMENTS

| 2004/0268012 A1 | 12/2004 | Ferguson |
| 2006/0045037 A1* | 3/2006 | Nomura .......................... 370/315 |
| 2006/0123166 A1* | 6/2006 | Toebes et al. .................. 710/106 |

FOREIGN PATENT DOCUMENTS

WO  WO 03107199 A2  12/2003

OTHER PUBLICATIONS

Hirofuchi T et al: USB/IP—a Peripheral Bus Extension for Device Sharing over IP Network: Proceedings of The USENIX Annual Technical Conference, XX, XX, Apr. 2005, pp. 47-60; XP007901448; section 3.2.

* cited by examiner

*Primary Examiner* — Clifford Knoll
(74) *Attorney, Agent, or Firm* — Thomas, Kayden, Horstemeyer & Risley, LLP (57) ABSTRACT

Certain aspects of a method and system for a hardware-based implementation of USB 1.1 over a high-speed link may comprise translating at a client side of a client server communication system, USB protocol messages comprising a first USB standard to corresponding encapsulated USB protocol messages, wherein the USB protocol messages comprising the first USB standard are received from a client device at the client side of the client server communication system. The translated corresponding encapsulated USB protocol messages may be communicated from the client side to a server at a server side of the client server communication system.

20 Claims, 6 Drawing Sheets

METHOD AND SYSTEM FOR HARDWARE BASED IMPLEMENTATION OF USB 1.1 OVER A HIGH SPEED LINK

CROSS-REFERENCE TO RELATED APPLICATIONS/INCORPORATION BY REFERENCE

This application makes reference to, claims priority to, and claims the benefit of U.S. Provisional Patent Application Ser. No. 60/697,571, filed on Jul. 8, 2005.

The above stated application is hereby incorporated herein by reference in its entirety.

FIELD OF THE INVENTION

Certain embodiments of the invention relate to communication interfaces. More specifically, certain embodiments of the invention relate to a method and system for a hardware based implementation of USB 1.1 over a high speed link.

BACKGROUND OF THE INVENTION

The Universal Serial Bus was originally developed in 1995 by a consortium of companies. The major goal of USB was to define an external expansion bus, which makes adding peripherals to a PC as easy as hooking up a telephone to a walljack. The ease-of-use and low cost made USB successful in the marketplace, with most peripheral vendors around the globe developing products to its specification.

One role of system software is to provide a uniform view of the system for all applications software. The system software may be adapted to hide hardware implementation details so that application software is more portable. The system software may manage the dynamic attach and detach of peripherals. This phase, called enumeration, involves communicating with the peripheral to discover the identity of a device driver that it should load, if not already loaded. A unique address is assigned to each peripheral during enumeration to be used for run-time data transfers. During run-time the host PC initiates transactions to specific peripherals, and each peripheral accepts its transactions and responds accordingly. Additionally, the host PC software incorporates the peripheral into the system power management scheme and may manage overall system power without user interaction.

The hub may provide additional connectivity for USB peripherals and managed power to attached peripherals. The hub may recognize dynamic attachment of a peripheral and provide device power for peripheral operation. A newly attached hub may be assigned its unique address, and hubs may be cascaded up to five levels deep, for example. During run-time a hub may operate as a bidirectional repeater and may repeat USB signals as required on upstream cables towards the host and downstream cables towards the device.

The USB peripherals may be adapted to request transactions sent from the host PC. The peripheral may respond to control transactions that, for example, request detailed information about the device and its configuration. The peripheral may transmit and receive data to/from the host using a standard USB data format. This standardized data movement to/from the PC host and interpretation by the peripheral gives USB enormous flexibility with little PC host software changes. The USB 1.1 peripherals may operate at 12 Mb/s or 1.5 Mb/s.

USB 2.0 is an evolution of the USB 1.1 specification, providing a higher performance interface. The USB 1.1 connectors and full-speed cables may support the higher speeds of USB 2.0 without any changes. The higher transmission speed may be negotiated on a device-by-device basis and if the higher speed is not supported by a peripheral, then the link operates at a lower speed of 12 Mb/s or 1.5 Mb/s as determined by the peripheral. The external USB 2.0 hub may have different signaling rates on its ports. Using a 40× multiplier for USB 2.0, the USB 2.0 hub may have an input rate of 480 Mb/s and output rates of 480 Mb/s, for example, for attached high speed USB 2.0 peripherals, and 12 Mb/s or 1.5 Mb/s, for example, for attached USB 1.1 peripherals. The USB 2.0 hub may match the data rates sent out of its downstream ports to the data rate appropriate to the attached device. The higher data rate of USB 2.0 may open up the possibilities of new peripherals, for example, video-conferencing cameras may perform better with access to higher bandwidth.

The system software may comprehend the increased capabilities of USB 2.0 peripherals so that it can optimize performance and detect sub-optimal configurations, for example, a USB 2.0 peripheral attached to a USB 1.1 hub, and recommends a better configuration for attaching the peripherals. A USB 2.0 hub may be adapted to accept high-speed transactions at the faster frame rate and deliver them to high-speed USB 2.0 peripherals and USB 1.1 peripherals. This data rate matching responsibility may require increased hub complexity and temporary buffering of the incoming high-speed data. In the case of communicating with an attached USB 2.0 peripheral, the hub repeats the high speed signals on appropriate USB 2.0 upstream and downstream cables. This allows USB 2.0 peripherals to utilize the majority of USB 2.0 bandwidth.

To communicate with USB 1.1 peripherals, a USB 2.0 hub may comprise a mechanism that supports the concept of matching the data rate with the capabilities of the downstream device. The hub may be adapted to manage the transition of the data rate from the high speed of the host controller to the lower speed of a USB 1.1 device.

A USB device may be serviced by a local USB host controller and appropriate host software to configure, operate, monitor and manage the USB devices. However, in order to enable a host with limited local intelligence to support some USB devices, the USB processing may be executed in a remote location based on a local entity sending the signals to that remote location. For example, in a client/server setup, where the client is a smart terminal with limited local processing but would like to offer the flexibility of supporting peripherals, for example, USB 1.1 peripherals such as keyboard, mouse and printer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for a hardware based implementation of USB 1.1 over a high speed link, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method and system for a hardware-based implementation of USB 1.1 over a high-speed link may comprise translating at a client side of a client server communication system, USB protocol messages comprising a first USB standard to corresponding encapsulated USB protocol messages, wherein the USB protocol messages comprising the first USB standard are received from a client device at the client side of the client server communication system. The translated corresponding encapsulated USB protocol messages may be communicated from the client side to a server at a server side of the client server communication system. The client device may receive the USB protocol messages comprising the first USB standard from the server, wherein the USB protocol messages comprising the first USB standard that were received from the server were translated from the second USB standard at the server side of the client server communication system prior to being received at the client device.

At least a first packet of data may be received from a server. The first packet of data may be a start-split SETUP packet, for example. The received start-split SETUP packet may be encapsulated and transmitted to a client side hub transaction translator (CHTT). The received first packet of data, for example, the SETUP packet may be transmitted to at least one universal serial bus (USB) 1.1 device by the CHTT. At least a second packet of data may be received from the server. At least a first acknowledgement (ACK) packet may be received from at least one USB 1.1 device by the CHTT. The first ACK packet may be received from the CHTT and the received first ACK packet may be transmitted to the server.

In an embodiment of the invention, a transparent hardware connection may be provided in a client/server setup over a high-speed link between USB 1.1 devices attached to the client and a USB 2.0 host system integrated with the server. For illustrative purposes, an exemplary high-speed link may comprise an Ethernet link, although the invention is not limited in this regard. Ethernet is based on carrier sense multiple access with collision detection (CSMA/CD) media access control mechanism. In this regard, each device such as a network interface card (NIC) that is coupled to the physical medium listens to the medium prior to transmitting a packet. If the medium is clear, then a device wishing to transmit information may begin transmitting. If a collision occurs, then the computers may retransmit the information at a random interval.

Figure 1:
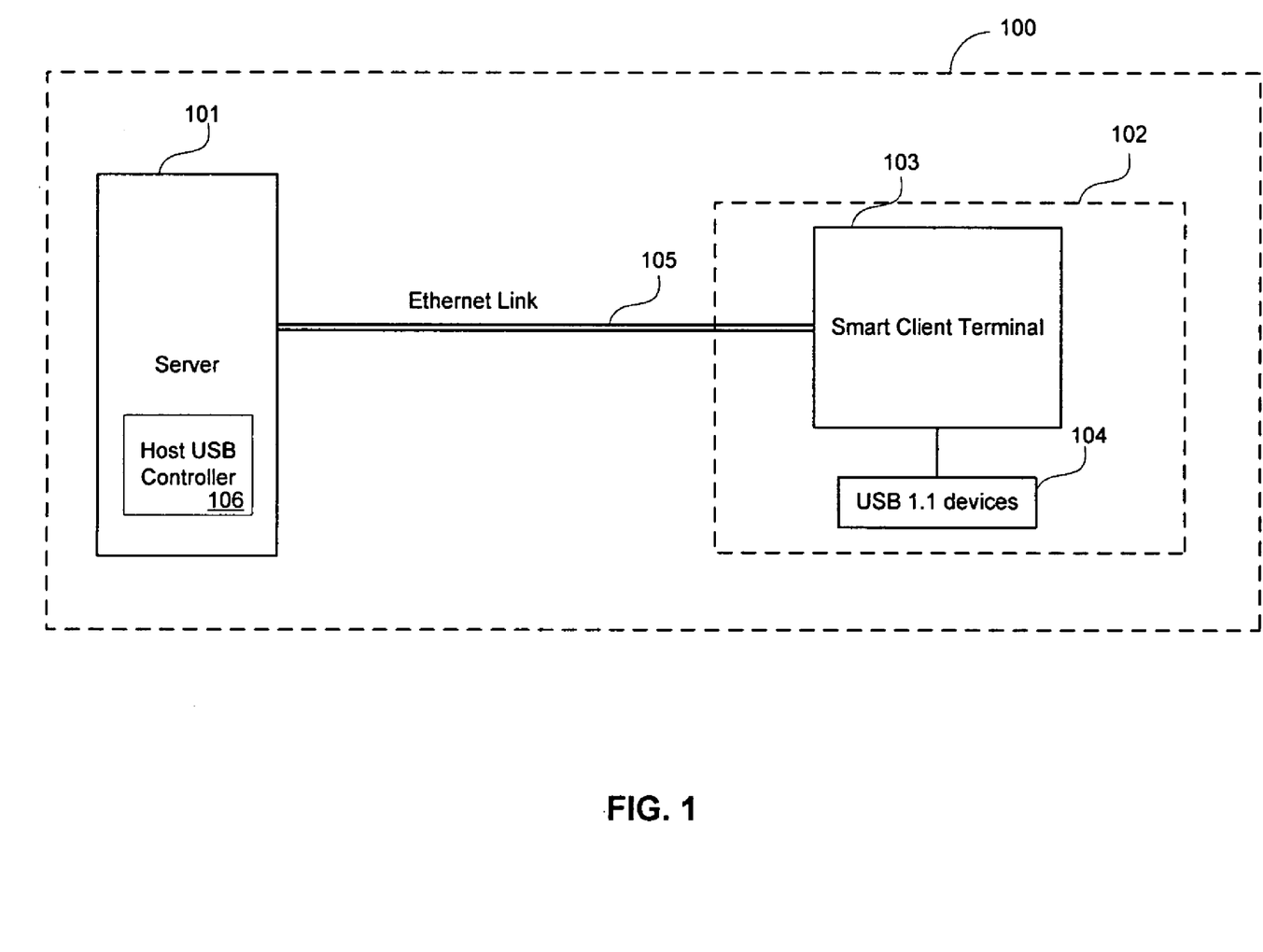
FIG. 1 is a block diagram of an exemplary client/server configuration for a USB system that may be utilized in connection with an embodiment of the invention.

FIG. 1 is a block diagram of an exemplary client/server configuration for a USB system that may be utilized in connection with an embodiment of the invention. Referring to FIG. 1, there is shown a USB system 100 that comprises a server 101, a client device 102 and an Ethernet link 105. The client device 102 comprises a smart client terminal 103 coupled to a USB 1.1 devices block 104. The Ethernet link 105 couples the server 101 to the smart client terminal 103. The server 101 comprises a host USB controller 106.

The server 101 may comprise suitable logic, circuitry and/or code that may be adapted to handle various kinds of requests from a client, for example, printing, or controlling access to voice mail, electronic mail and facsimile services. The server 101 may also be adapted to handle large amounts of data. The server 101 comprises a host USB controller 106. The host USB controller 106 may comprise suitable logic, circuitry and/or code that may be adapted to be coupled to a plurality of USB devices. The USB system 100 comprises a host controller and multiple client devices connected in a tree-like fashion using special hub devices. Based on USB specification, there is a limit of 5 levels of branching hubs per controller. Up to 127 devices may be connected to a single host controller 106.

The client device 102 may comprise suitable logic, circuitry and/or code that may be adapted to request information or applications from the server 101. The client device 102 comprises a smart client terminal 103 coupled to a USB 1.1 devices block 104. The smart client terminal 103 may comprise suitable logic, circuitry and/or code that may be adapted to allow the USB 1.1 devices 104 to access the server 101 via a communication protocol, for example, the Ethernet link 105. The USB 1.1 devices block 104 may comprise a plurality of USB 1.1 devices, for example, a flash storage device, a webcam, a digital camera, a modem, a printer, a scanner, a mouse, a keyboard, or a telephone.

In a client/server model, the client 102 may make a service request from the server 101, which fulfills the request. In a network, the client/server model may provide a convenient way to interconnect programs that are distributed across different network locations. For example, to check a bank account from a computer, a client program in the computer forwards the request to a server program at the bank. The client program may be, for example, an accounting application or Web Browser. Notwithstanding, the client program may in turn forward the request to its own client program that sends a request to a database server at another bank computer to retrieve the account balance. The balance may be returned back to the bank data client, which in turn may serve it back to the client in the personal computer. In a client/server model, the server 101, sometimes called a daemon, may be activated and awaits client 102 requests. A plurality of USB 1.1 client devices 104 may share the services of a common server 101. Both client 102 and server 101 may be a part of a larger program or application.

A virtual connection may be present between the USB devices block 104 coupled to the client device 102 and the USB host controller 106 residing on the server 101 at the remote location. There may be a challenge dealing with signaling due to additional latency when maintaining the flexibility of the local entity supporting multiple devices with different capabilities without having local intelligence to support it and handling the host stack issues on the remote location.

In a software approach, the USB 1.1 devices 104 may communicate with a local USB 1.1 host controller in the client 102 and the device data may be relayed over the Ethernet link 105 by software to a special driver on the host server

101. In a hardware approach, the USB 1.1 devices 104 may be virtually connected to the USB host controller 106 via a special hardware. If the client functionality is independent of the USB 1.1 device, the server USB stack may not require any changes over the support provided for a local USB device.

Figure 2:
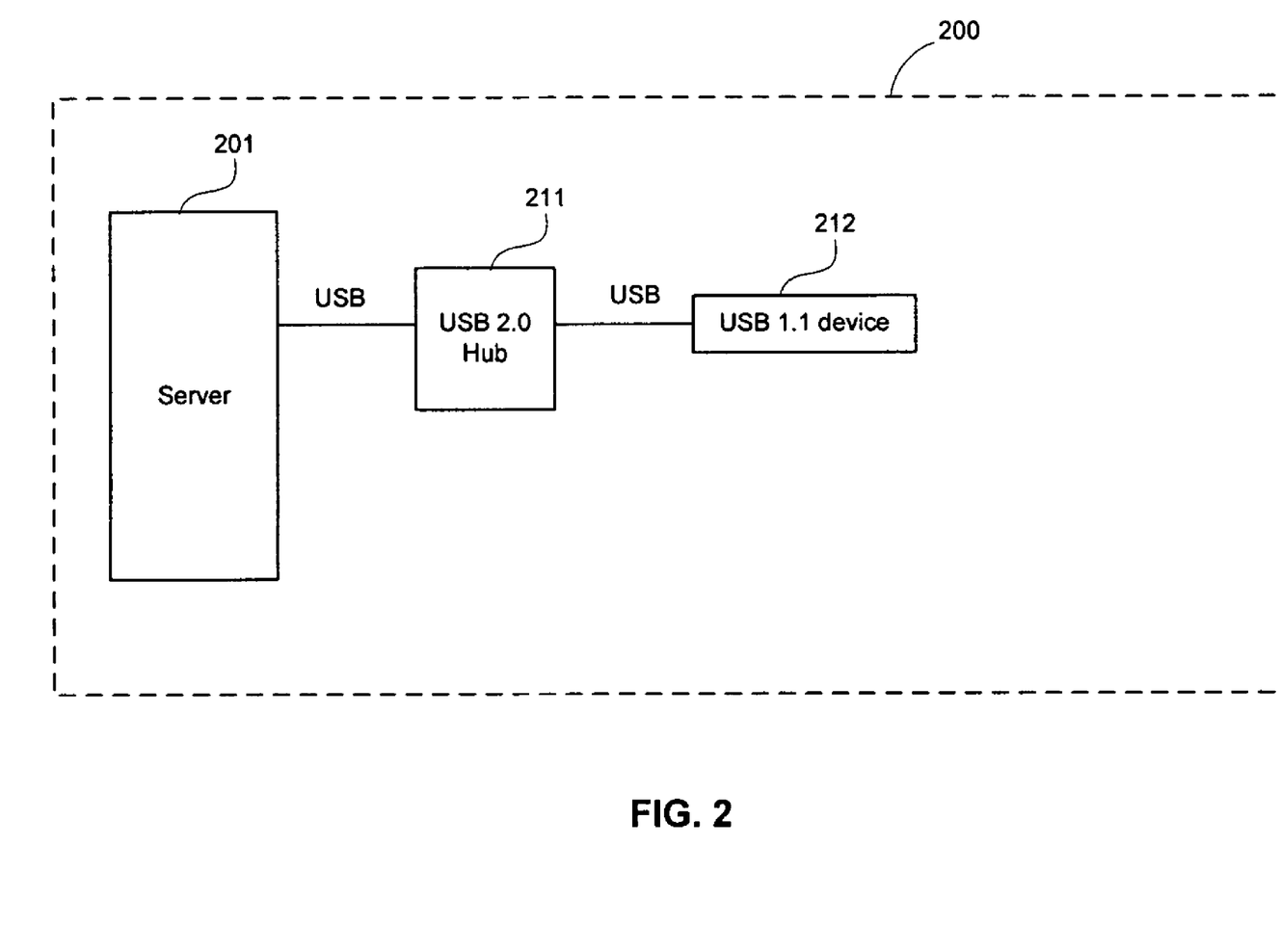
FIG. 2 is a block diagram of a single computer USB system with a USB 2.0 hub that may be utilized in connection with an embodiment of the invention.

FIG. 2 is a block diagram of a single computer USB system with a USB 2.0 hub that may be utilized in connection with an embodiment of the invention. Referring to FIG. 2, there is shown a server 201, a USB 2.0 hub 211 and a USB 1.1 device 212. The server 201 may comprise suitable logic, circuitry and/or code that may be adapted to handle various kinds of requests from a client, for example, printing, or controlling access to voice mail, electronic mail and facsimile services. The server 201 may also be adapted to handle large amounts of data. The USB 2.0 hub 211 may comprise suitable logic, circuitry and/or code that may be adapted to increase the number of USB ports on a personal computer (PC). The USB 1.1 device block 212 may be, for example, a flash storage device, a webcam, a digital camera, a modem, a printer, a scanner, a mouse, a keyboard, or a telephone.

The USB system 200 may be adapted to connect several USB devices 212 to a host controller on the server 201 through a chain of USB 2.0 hubs 211. The USB devices and hubs have associated pipes or logical channels, which are connections from the host controller on the server 201 to a logical entity on the device named an endpoint.

Each endpoint may transfer data in one direction only, either into or out of the device, so each pipe is unidirectional. All USB devices have at least two such pipes/endpoints, namely endpoint 0 which is used to control the device on the bus. There an inward and an outward pipe numbered 0 on each device. The pipes may be divided into four different categories by way of their transfer type, for example, control transfers, isochronous transfers, interrupt transfers and bulk transfers. The control transfers may be used for short, simple commands to the device, and a status response by the bus control pipe number 0. The isochronous transfers may be used at some guaranteed speed but with possible data loss, for example, realtime audio or video. The interrupt transfers may be used for devices that need guaranteed quick responses or bounded latency, for example, pointing devices and keyboards. The bulk transfers may be used for large sporadic transfers using all remaining available bandwidth but with no guarantees on bandwidth or latency, for example, file transfers.

The USB device 212 connected to the bus has one device descriptor and one or more configuration descriptors. Each configuration descriptor in turn has one or more interface descriptors, which describe certain aspects of the device, so that it may be used for different purposes, for example, a camera may have both audio and video interfaces. These interface descriptors in turn have one default interface setting and possibly more alternate interface settings which in turn have endpoint descriptors. An endpoint may be reused among several interfaces and alternate interface settings.

The hi-speed devices may fall back to the slower data rate of full speed when plugged into a full speed hub. The hi-speed hubs may have a special function called the transaction translator that segregates full speed and low speed bus traffic from hi-speed traffic. The transaction translator in a hi-speed hub may function as a completely separate full speed bus to full speed and low speed devices attached to it.

Figure 3:
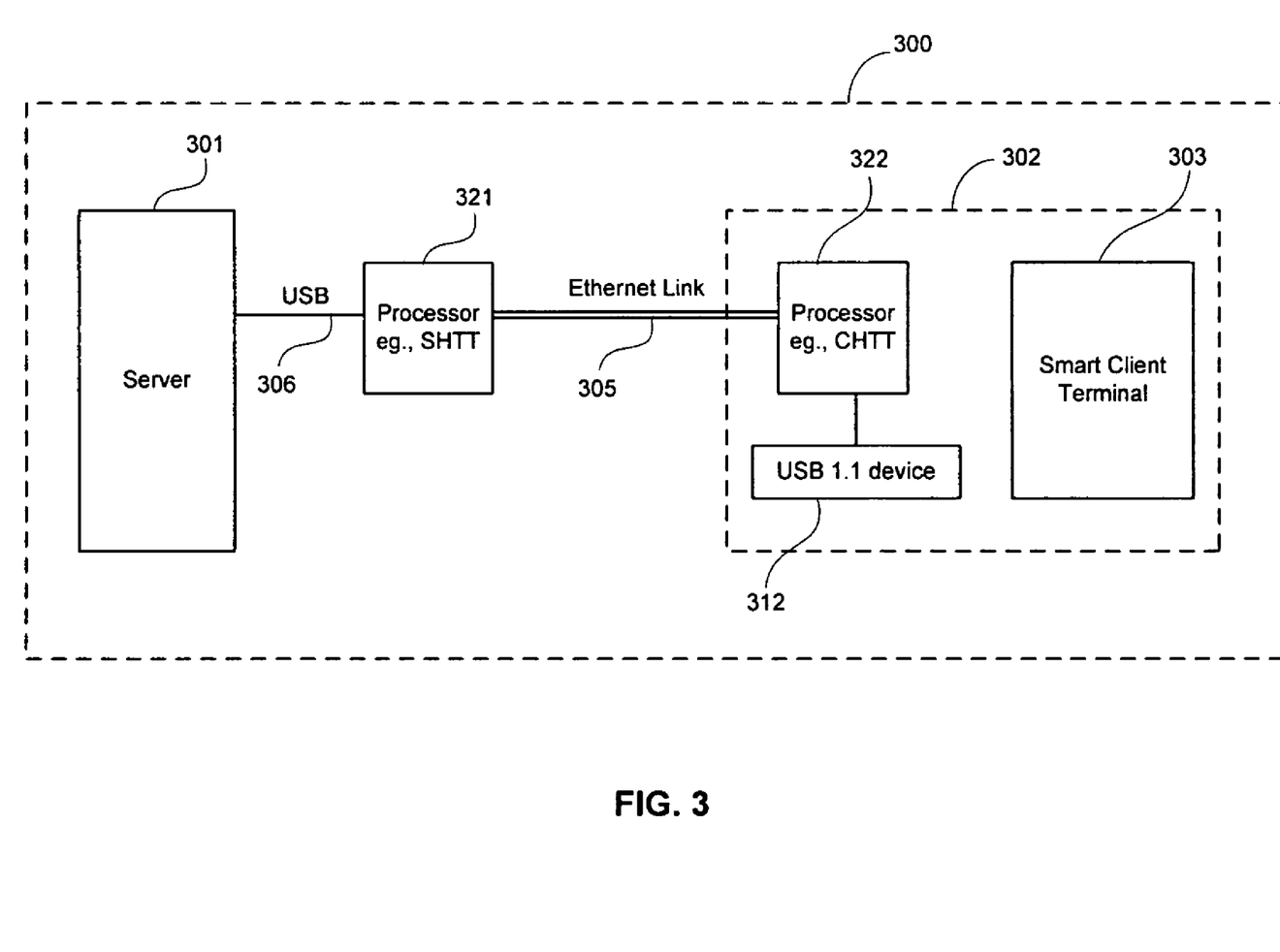
FIG. 3 is a block diagram of a single computer USB2.0 system with a server side hub transaction translator (SHTT) and a client side hub transaction translator (CHTT), in accordance with an embodiment of the invention.

FIG. 3 is a block diagram of a single computer USB 2.0 system with a server side hub transaction translator (SHTT) and a client side hub transaction translator (CHTT), in accordance with an embodiment of the invention. Referring to FIG. 3, there is shown a USB system 300. The USB system 300 comprises a server 301, a client 302, a processor which may be referred to as a server side hub transaction translator (SHTT) 321, and an Ethernet link 305. The client 302 comprises a processor, which may be referred to as a client side hub transaction translator (CHTT) 322, a smart client terminal 303 and a USB 1.1 devices block 312. The server 301 is coupled to the SHTT 321 via a USB connection 306. The SHTT 321 is coupled to the CHTT 322 via an Ethernet link 305. In accordance with an embodiment of the invention, the SHTT 321 device may be located on a plug-in card inside the server 301.

A hub transaction translator (HTT) may be utilized when a USB 1.1 device 312 is coupled to a USB 2.0 host server 301 through an external high-speed (HS) hub. In this regard, the HTT provides the capability to bridge USB 1.1 data traffic between a USB 2.0 host server 301 and a USB 1.1 device 312 by using a split transaction protocol. The split transaction protocol allows full speed and low speed devices to be attached to hubs operating at high speed. These transactions involve host controllers and hubs and are not visible to devices. This prevents a USB 1.1 device 312 from adversely affecting operation of the USB 2.0 host server's 301 high-speed bandwidth by isolating the two signaling environments of USB 1.1 and USB 2.0.

In an embodiment of the invention, the functionality of the HTT may be split into server and client sections. The server section may be referred to as the SHTT 321 and the client section may be referred to as the CHTT 322. The server side hub transaction translator (SHTT) 321 may comprise suitable logic, circuitry and/or code that may be enabled to receive an encapsulated SETUP packet from the server 301 and transmit the received encapsulated SETUP packet to the CHTT 322 over the network link.

The client side hub transaction translator (CHTT) 322 may comprise suitable logic, circuitry and/or code that may be enabled to transmit the received encapsulated SETUP packet to at least one universal serial bus (USB) 1.1 device 312. The CHTT 322 may be adapted to receive at least a first acknowledgement (ACK) packet from at least one USB 1.1 device 312. The SHTT 321 may be adapted to receive the first ACK packet from the CHTT 322 and the SHTT 321 transmits the received first ACK packet to the server 301.

The USB 2.0 bus timing and protocol requirements at the server 301 end may be handled by the SHTT 321. The USB 1.1 bus timing and protocol requirements at the client device 302 end may be handled by the CHTT 322. The USB 1.1 protocol data between the SHTT 321 and CHTT 322 is encoded and transmitted over a high-speed link, for example, the Ethernet link 305.

Figure 4:
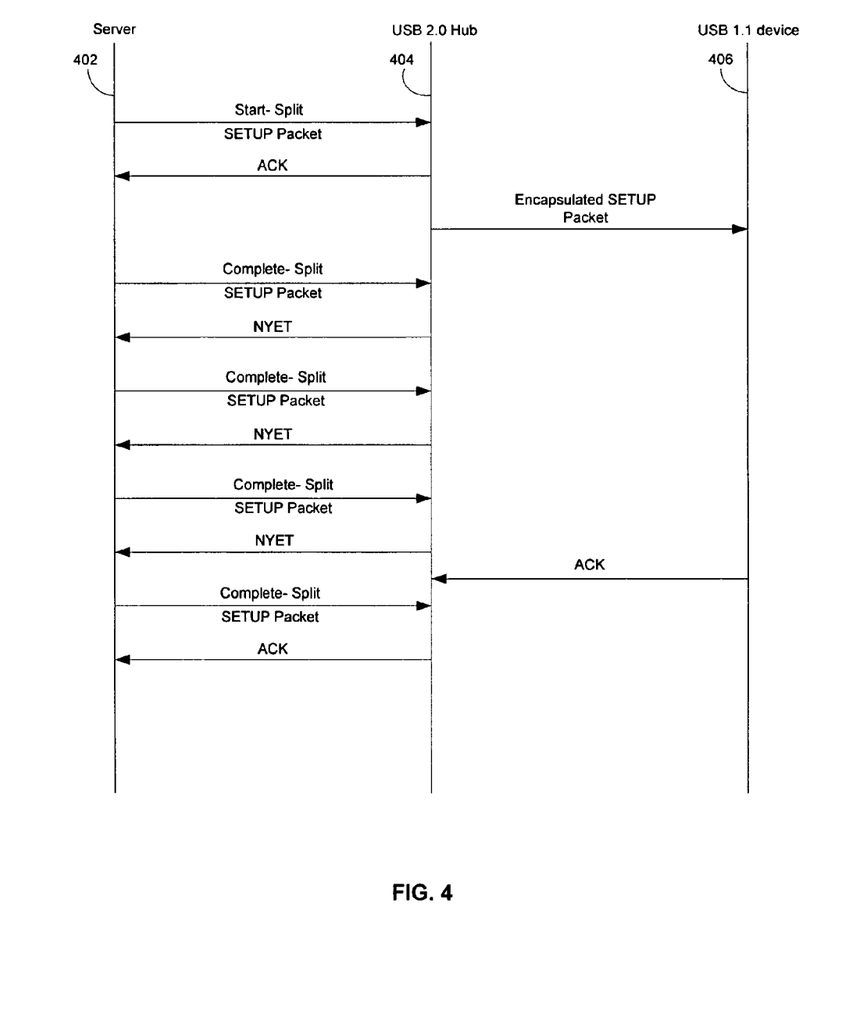
FIG. 4 is a flow diagram illustrating an exemplary USB 1.1 setup packet transaction over a USB 2.0 hub, in accordance with an embodiment of the invention.

FIG. 4 is a flow diagram illustrating an exemplary USB 1.1 setup packet transaction over a USB 2.0 hub, in accordance with an embodiment of the invention. Referring to FIG. 4, there is shown a server 402, a USB 2.0 hub 404 and a USB 1.1 device 406. The server 402 may comprise suitable logic, circuitry and/or code that may be adapted to handle various kinds of requests from a client, for example, printing, or controlling access to voice mail, electronic mail and facsimile services. The USB 2.0 hub 404 may comprise suitable logic, circuitry and/or code that may be adapted to increase the number of USB ports on a personal computer (PC). The USB 1.1 device 406 may be, for example, a flash storage device, a webcam, a digital camera, a modem, a printer, a scanner, a mouse, a keyboard, or a telephone.

The host server 402 transmits a start-split SETUP packet to the USB 2.0 hub 404, which transmits an acknowledgement (ACK) packet back to the server 402. The USB 2.0 hub 404 relays an encapsulated SETUP packet to the USB 1.1 device 406 that is connected to its downstream port. The host server 402 now sends a complete-split SETUP packet to the USB 2.0 hub 404, which may respond in one of two ways. When the USB 1.1 device 406 responds to the USB 2.0 hub 404 with an ACK packet for the received encapsulated SETUP packet, the USB 2.0 hub 404 will relay that ACK packet back to the host server 402. Until then the USB 2.0 hub 404 transmits a not yet (NYET) acknowledgement packet back to the host server 402. After the USB 2.0 hub 404 transmits the ACK packet to the server 402 in response to the next received complete-split SETUP packet, the split-SETUP transaction is completed.

Figure 5:
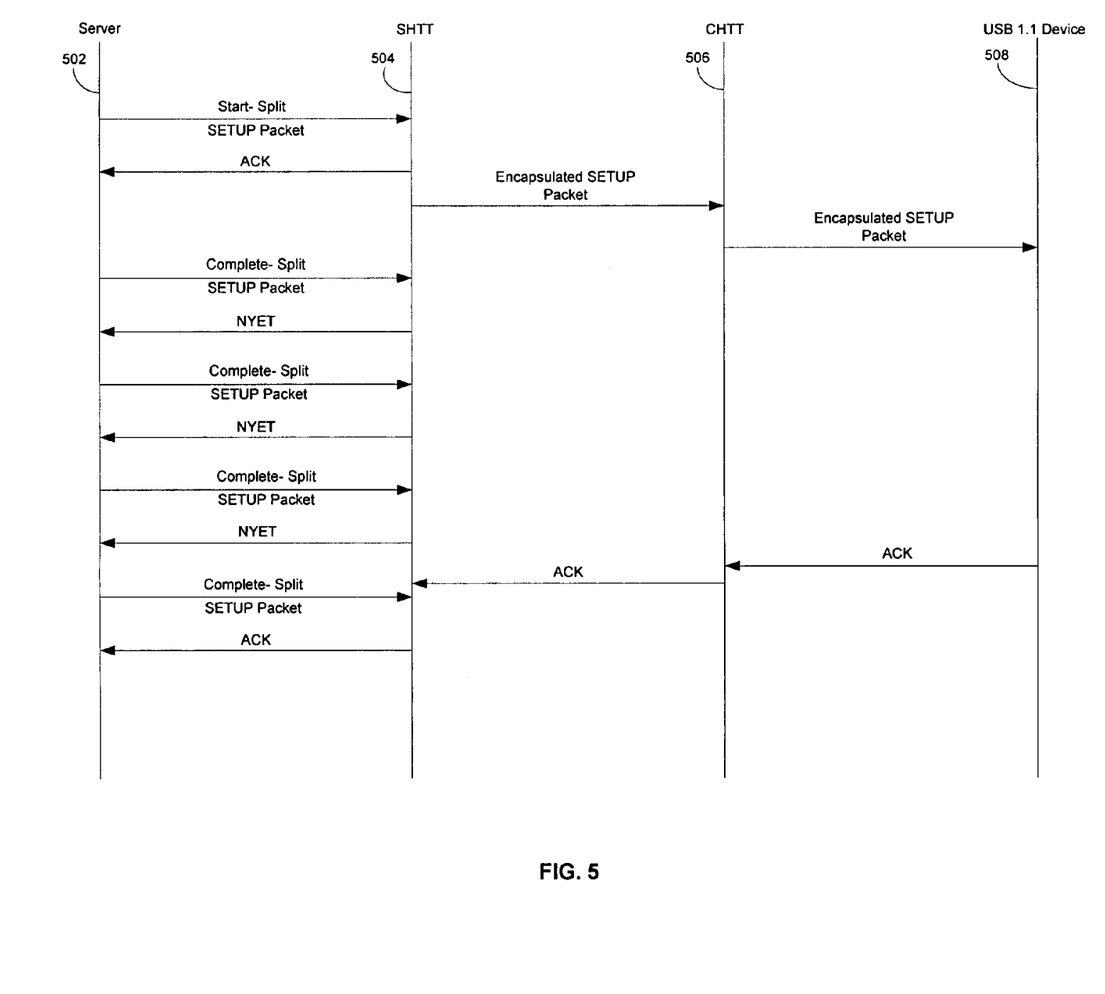
FIG. 5 is a flow diagram illustrating an exemplary USB 1.1 setup packet transaction over a USB 2.0 system with a server side hub transaction translator (HTT) and a client side HTT, in accordance with an embodiment of the invention.

FIG. 5 is a flow diagram illustrating an exemplary USB 1.1 setup packet transaction over a USB 2.0 system with a server side hub transaction translator (SHTT) and a client side hub transaction translator (CHTT), in accordance with an embodiment of the invention. Referring to FIG. 5, there is shown a server 502, a SHTT 504, a CHTT 506 and a USB 1.1 device 508. The server 502 may comprise suitable logic, circuitry and/or code that may be adapted to handle various kinds of requests from a client, for example, printing, or controlling access to voice mail, electronic mail and facsimile services. The server 502 is coupled to the SHTT 504 via a USB connection. The SHHT 504 is coupled to the CHHT 506 via an Ethernet link, for example. The USB 1.1 device 508 may be, for example, a flash storage device, a webcam, a digital camera, a modem, a printer, a scanner, a mouse, a keyboard, or a telephone.

The host server 502 transmits a start-split SETUP packet to the SHTT 504, which transmits an acknowledgement (ACK) packet back to the server 502. The SHTT 404 relays an encapsulated SETUP packet over a high speed link to the CHTT 506. The CHTT 506 relays the encapsulated SETUP packet to the USB 1.1 device 508 that is connected to its downstream port. The host server 502 now sends a complete-split SETUP packet to the SHTT 504, which may respond with a not yet (NYET) acknowledgement packet back to the host server 502. When the USB 1.1 device 508 transmits an ACK packet to the CHTT 506 in response to receiving the encapsulated SETUP packet, the CHTT 506 will relay that ACK packet back to the SHTT 504. Until then the SHTT 504 transmits a not yet (NYET) acknowledgement packet back to the host server 502. After the SHTT 504 transmits the ACK packet to the server 502 in response to the next received complete-split SETUP packet, the split-SETUP transaction is completed. The latency issues due to the high-speed link may be handled by the split transaction protocol that isolates the host to SHTT signaling from the CHTT to device signaling.

Figure 6:
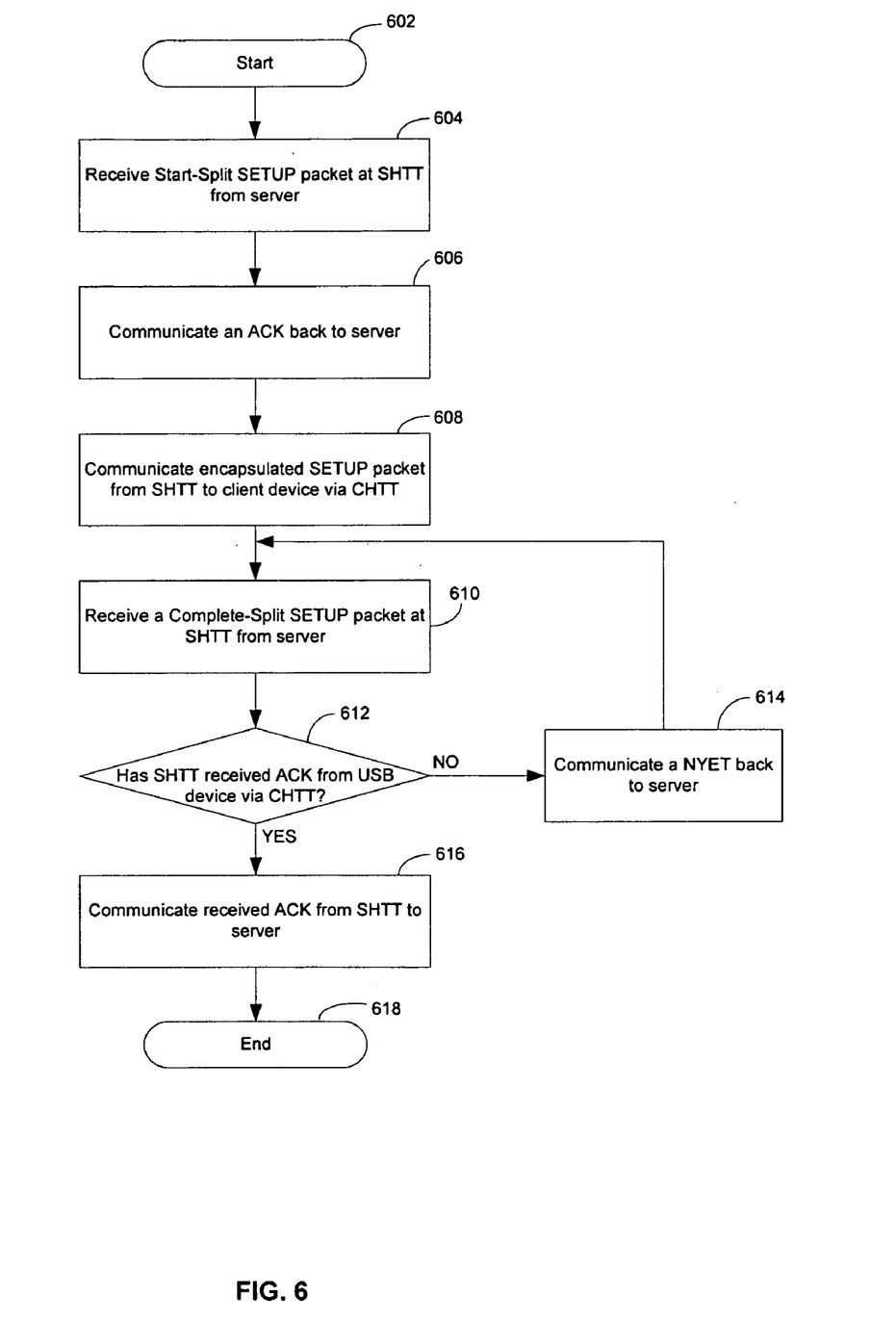
FIG. 6 is a flow chart illustrating exemplary steps for a hardware-based implementation of USB 1.1 over a high-speed link, in accordance with an embodiment of the invention.

FIG. 6 is a flow chart illustrating exemplary steps for a hardware-based implementation of USB 1.1 over a high-speed link, in accordance with an embodiment of the invention. Referring to FIG. 6, exemplary steps may begin at step 602. In step 604, a hub transaction translator located on the server side (SHTT) may receive a start-split SETUP packet from the server. In step 606, the SHTT communicates an acknowledgement (ACK) packet back to the server in response to the received start-split SETUP packet from the server. In step 608, an encapsulated SETUP packet may be communicated from the SHTT to a client device via a hub transaction translator located on the client side (CHTT). In step 610, the SHTT may receive a complete-split SETUP packet from the server. In step 612, it may be determined whether the SHTT has received an ACK packet from the client device via the CHTT in response to the communicated encapsulated SETUP packet. If the SHTT has not received the ACK packet from the client device via the CHTT in response to the communicated encapsulated SETUP packet, control passes to step 614. In step 614, the SHTT may communicate a not yet (NYET) packet to the server indicating that the SHTT has not yet received the ACK packet from the client device via the CHTT in response to the communicated encapsulated SETUP packet. If the SHTT has received the ACK packet from the client device via the CHTT in response to the communicated encapsulated SETUP packet, control passes to step 616. In step 616, the SHTT may communicate the received ACK packet to the server indicating the completion of the split-SETUP transaction. Control then passes to end step 618.

Another embodiment of the invention may provide a machine-readable storage, having stored thereon, a computer program having at least one code section executable by a machine, thereby causing the machine to perform the steps as described above for hardware based implementation of USB 1.1 over a high speed link.

In accordance with an embodiment of the invention, a system for communicating via a bus interface in a network may comprise a transaction translator at a client side of a client server communication system 300, for example, CHTT 322 that translates USB protocol messages comprising a first USB standard to corresponding encapsulated USB protocol messages, wherein the USB protocol messages comprising the first USB standard are received from a client device at the client side of the client server communication system 300. The transaction translator at the client side of the client server communication system 300, for example, CHTT 322 communicates the translated corresponding encapsulated USB protocol messages from the client side to a server, for example, server 301 at a server side of the client server communication system 300.

At least one client device, for example, USB 1.1 device 312 may be adapted to receive the USB protocol messages comprising the first USB standard from the server, for example, server 301, wherein the USB protocol messages comprising the first USB standard that are received from the server, for example, server 301 were translated from the second USB standard at the server side of the client server communication system 300 prior to being received at the client device, for example, USB 1.1 device 312. The first USB format may be USB 1.1. The second USB format may be USB 2.0.

The USB protocol messages comprising the first USB standard received from the client device, for example, USB 1.1 device 312 at the client side of the client server communication system 300 comprises an acknowledgement (ACK) packet. The translated corresponding encapsulated USB protocol messages comprising the second USB standard communicated from the client side of the client server communication system 300 to the server, for example, server 301 at the server side of the client server communication system 300 comprises an acknowledgement (ACK) packet. The client device, for example, USB 1.1 device 312 may comprise a USB interface that is USB 1.1 standard compliant. The server, for example, server 301 may comprise a USB interface that is USB 2.0 standard compliant. The transaction translator at the client side of the client server communication system 300, for example, CHTT 322 may be adapted to communicate the translated corresponding encapsulated USB protocol messages comprising USB 2.0 standard from the client side of the client server communication system 300 to the server, for example, server 301 at the server side of the client server communication system 300 via an Ethernet link 305. The client device, for example, USB 1.1 device 312 may be adapted to receive the USB protocol messages comprising USB 1.1 standard from the server, for example, server 301 via an Ethernet link 305.

In accordance with an embodiment of the invention, a method and system for implementing universal serial bus (USB) communication may comprise a server side hub transaction translator (SHTT), for example, SHTT 321 that receives at least a first packet of data from a server 301. The first packet of data may be a start-split SETUP packet, for example. The SHTT 321 may enable transmission of an encapsulated SETUP packet to a client side hub transaction translator (CHTT), for example, CHTT 322. The CHTT 322 may enable transmission of the received encapsulated SETUP packet to at least one universal serial bus (USB) 1.1 device 312. The SHTT 321 may enable reception of at least a second packet of data from the server 301. The CHTT 322 may enable reception of at least a first acknowledgement (ACK) packet from at least one USB 1.1 device 312. The SHTT 321 may be adapted to receive the first ACK packet from the CHTT 322 and the SHTT 321 transmits the received first ACK packet to the server 301.

The SHTT 321 may enable transmission of at least a second ACK packet in response to the received first packet of data or the encapsulated SETUP packet from the server 301. The SHTT 321 may enable reception of the second packet of data, for example, the complete-split SETUP packet from the server 301 in response to the transmitting of the second ACK packet. The SHTT 321 may enable transmission of at least one not yet (NYET) ACK packet to the server 301 in response to the received second packet of data, for example, the complete-split SETUP packet. The SHTT 321 may enable reception of the first packet of data or encapsulated SETUP packet from the server over a USB link. The SHTT 321 may enable reception of the second packet of data or the complete-split SETUP packet from the server 301 over a USB link.

The SHTT 321 may enable transmission of the received first ACK packet to the server 301 over a USB link. The CHTT 322 may enable transmission of at least a portion of the received first packet of data to the USB 1.1 device 312 over an Ethernet link, for example. The CHTT 322 may enable reception of the first ACK packet from the USB 1.1 device 312 over an Ethernet link, for example. The SHTT 321 may enable transmission of the received first ACK packet to the server 301 in response to receiving the first ACK packet from the CHTT 322. The SHTT 321 may enable transmission of at least one not yet (NYET) ACK packet to the server 301 if the first ACK packet is not received from the CHTT 322.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating packets, the method comprising:
in a client-server communication system:
communicating, from a server side hub transaction translator, a first acknowledgement packet to a server in response to receiving a start setup packet from said server;
communicating an encapsulated setup packet to at least one USB device based on said communicated first acknowledgement packet; and
communicating, to said server, a second acknowledgement packet that is received from said at least one USB device in response to receiving one or more complete setup packets from said server.

2. The method according to claim 1, wherein said client-server communication system is capable of handling USB 1.1 protocol packets.

3. The method according to claim 1, comprising communicating said encapsulated setup packet to said at least one USB device at a client side of said client server communication system via a client side hub transaction translator.

4. The method according to claim 1, wherein said client-server communication system is capable of handling USB 2.0 protocol packets.

5. The method according to claim 1, comprising receiving one or more complete setup packets from said server based on said communicated first acknowledgement packet.

6. The method according to claim 1, comprising communicating not yet acknowledgement packet to said server, if said server side hub transaction translator has not received said second acknowledgement packet from said at least one USB device.

7. The method according to claim 1, wherein said at least one USB device comprises a USB interface that is USB 1.1 protocol compliant.

8. The method according to claim 1, wherein said server comprises a USB interface that is USB 2.0 protocol compliant.

9. The method according to claim 1, comprising communicating said encapsulated setup packet to said at least one USB device via an Ethernet link.

10. The method according to claim 1, comprising receiving said second acknowledgement packet from said at least one USB device via an Ethernet link.

11. A system for communicating packets, the system comprising:
one or more circuits for use in a server side hub transaction translator of a client server communication system, said one or more circuits being operable to:
communicate a first acknowledgement packet to a server in response to receiving a start setup packet from said server;
communicate an encapsulated setup packet to at least one USB device based on said communicated first acknowledgement packet; and communicate, to said server, a second acknowledgement packet that is received from said at least one USB device in response to receiving one or more complete setup packets from said server.

12. The system according to claim 11, wherein said client-server communication system is capable of handling USB 1.1 protocol packets.

13. The system according to claim 11, wherein said one or more circuits are operable to communicate said encapsulated setup packet to said at least one USB device at a client side of said client server communication system via a client side hub transaction translator.

14. The system according to claim 11, wherein said client-server communication system is capable of handling USB 2.0 protocol packets.

15. The system according to claim 11, wherein said one or more circuits are operable to receive one or more complete setup packets from said server based on said communicated first acknowledgement packet.

16. The system according to claim 11, wherein said one or more circuits are operable to communicate not yet acknowledgement packet to said server, if said server side hub transaction translator has not received said second acknowledgement packet from said at least one USB device.

17. The system according to claim 11, wherein said at least one USB device comprises a USB interface that is USB 1.1 protocol compliant.

18. The system according to claim 11, wherein said server comprises a USB interface that is USB 2.0 protocol compliant.

19. The system according to claim 11, wherein said one or more circuits are operable to communicate said encapsulated setup packet to said at least one USB device via an Ethernet link.

20. The system according to claim 11, wherein said one or more circuits are operable to receive a second acknowledgement packet from said at least one USB device via an Ethernet link.

* * * * *